United States Patent
Kim

(10) Patent No.: US 9,156,437 B2
(45) Date of Patent: Oct. 13, 2015

(54) REMOTE STARTING SYSTEM FOR VEHICLE AND CONTROL METHOD FOR THE SAME

(75) Inventor: Jong Ho Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 764 days.

(21) Appl. No.: 13/314,949

(22) Filed: Dec. 8, 2011

(65) Prior Publication Data

US 2013/0073121 A1  Mar. 21, 2013

(30) Foreign Application Priority Data

Sep. 21, 2011  (KR) .......................... 10-2011-0095426

(51) Int. Cl.
*B60R 25/20* (2013.01)

(52) U.S. Cl.
CPC ..................... *B60R 25/209* (2013.01)

(58) Field of Classification Search
CPC .............. G07C 5/008; G07C 9/00309; G07C 2009/00793; B60R 25/24; B60R 25/209; B60R 25/04; B60R 25/0405; F02N 11/0807; F02N 11/08; F02N 11/105
USPC ........... 701/2; 340/5.7, 5.71, 5.72, 10.2, 10.5, 340/426.18, 12.22, 992
See application file for complete search history.

(56) References Cited

U.S. PATENT DOCUMENTS

| | | | |
|---|---|---|---|
| 7,388,469 B2* | 6/2008 | Asada | 340/10.5 |
| 7,545,258 B2* | 6/2009 | Endo | 340/426.11 |
| 8,319,605 B2* | 11/2012 | Hassan et al. | 340/5.72 |
| 8,373,581 B2* | 2/2013 | Hassan et al. | 340/992 |
| 8,427,277 B2* | 4/2013 | Booher et al. | 340/5.7 |
| 2005/0012593 A1* | 1/2005 | Harrod et al. | 340/5.72 |
| 2009/0265048 A1* | 10/2009 | Ono et al. | 701/2 |
| 2011/0043328 A1* | 2/2011 | Bassali | 340/5.71 |
| 2011/0202201 A1* | 8/2011 | Matsubara | 701/2 |

* cited by examiner

*Primary Examiner* — John Q Nguyen
*Assistant Examiner* — Nadeem Odeh
(74) *Attorney, Agent, or Firm* — Mintz Levin Cohn Ferris Glovsky and Popeo, P.C.; Peter F. Corless

(57) ABSTRACT

Disclosed is a remote start system for a vehicle which activates a timer configured after a vehicle is remote started when a door of the vehicle is opened. After activating the timer, a fob (e.g., a keyless remote) is searched and certified once a driver's door is closed, a brake is operated, or a predetermined time has elapsed without any operation of the vehicle. Once the fob is certified, the vehicle is converted from a remote start mode to a normal mode. If, however, the fob is not certified the remote start is terminated.

11 Claims, 5 Drawing Sheets

REMOTE STARTING SYSTEM FOR VEHICLE AND CONTROL METHOD FOR THE SAME

CROSS-REFERENCE TO RELATED APPLICATION

This application claims priority to and the benefit of Korean Patent Application No. 10-2011-0095426 filed in the Korean Intellectual Property Office on Sep. 21, 2011, the entire contents of which are incorporated herein by reference.

BACKGROUND OF THE INVENTION (a) Field of the Invention

The present invention relates to a remote starting system for a vehicle and a control method for the same. More particularly, the present invention relates to a remote starting system for a vehicle and a control method for the same which may increase convenience and simultaneously prevent theft of a vehicle.

(b) Description of the Related Art

Generally, remote start systems start a vehicle using a remote using RF signals. Remote start is different from a normal starting of a vehicle which requires that the user actually insert a key into the ignition of the vehicle.

In conventional systems, vehicle starting apparatuses may include a smart key or a Remote Keyless Entry (RKE) and also a portable transmitter transmitting a wireless signal (e.g., an RF signal) and a receiver which is installed in the vehicle to receive the wireless signal from the portable transmitter. The receiver is communicated with a device such as a door locking system, an engine driving system for starting a vehicle or so on.

In many of the conventional system, the vehicle is capable of being driven while the vehicle is left unattended. That is, when a vehicle is started by a remote starting system and a driver does not operate the vehicle immediately or leaves the vehicle unattended, a thief may easily steal the vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a remote starting system for a vehicle and a control method for the same having advantages of increasing convenience and simultaneously preventing theft of a vehicle.

A remote starting system for a vehicle according to an exemplary embodiment of the present invention may include (a) remote starting the vehicle, (b) once the vehicle has been remote started, activating a timer when a door of the vehicle is opened. (c) Once the timer has been activated, a fob (e.g., a keyless remote) is searched and certified when a driver's door is closed, a brake is operated, or a predetermined time has elapsed on the timer without any operation of the vehicle and when the fob is certified, the vehicle is converted from a remote start mode to a normal mode. If, however, the fob is not certified, the remote start is terminated.

In the step (a), a remote start signal received from an external terminal may be relayed to a telematics module of the vehicle, the signal may be transmitted to a signal processing means through a body control module from the telematics module and the remote starting may be initiated. The predetermined time may be 30 seconds.

The remote starting may be stopped when a shift lever is shifted from Park to any other gear or position, a starting button is on, or when the vehicle begins moving.

When a door is opened during a locked state of the vehicle in the step (b), the remote start may be terminated. The certifying of the fob may be implemented when the signal processing means receives a unique ID signal from the fob and certifies the fob using the received unique ID signal.

A remote starting system for a vehicle according to exemplary embodiment of the present invention may include a telematics module receiving remote start signal from the vehicle, a body control module which checks the vehicle's operational condition of the vehicle, receives the remote start signal from the telematics module and transmits the remote start signal when the remote start signal is appropriated to the vehicle.

The exemplary embodiment also includes a signal processing means which receives the remote start signal transmitted from the body control module and checks the vehicle's operational condition, and commences the remote starting and a timer which begins counting when a door of the vehicle is opened after the remote start has been activated. The signal processing means may search a fob and certify the fob if a driver's seat door is closed, a brake is operated, or a predetermined time has elapsed without any operation after starting the timer, and change the remote starting to a general starting if the fob is certified or stops the remote starting if the fob is not certified.

The body control module may generate and transmit warning signals to the signal processing means when a door is opened during a locked state of the vehicle after the remote start is initiated, and the signal processing means may receive the warning signal and terminate the remote start if necessary. The predetermined time may be 30 seconds.

The signal processing means may stop the remote starting when a shift lever is shifted from Park to any other position or gear, a starting button is on or a vehicle has begun to move in once remote start has been activated.

The signal processing means may implement the certifying of the fob if the signal processing means receives a unique ID signal from the fob and certifies the fob using the received unique ID signal.

As described above, a remote starting system for a vehicle and a control method for the same according to the exemplary embodiment of the present invention may prevent theft of a vehicle while the vehicle is unattended. In the remote starting state, once the fob is certified, the remote start is changed to normal start and thus further operation for starting a vehicle is not required and driver's convenience may be improved.

BRIEF DESCRIPTION OF THE DRAWINGS

The above and other objects and features of the present invention will become apparent from the following description of embodiments given in conjunction with the accompanying drawings, in which.

DESCRIPTION OF SYMBOLS

10: terminal
20: server
100: telematics module (TMU)
200: body control module (BCM)
300: signal processing means
400: fob
500: timer

DETAILED DESCRIPTION OF THE EMBODIMENTS

Exemplary embodiments of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
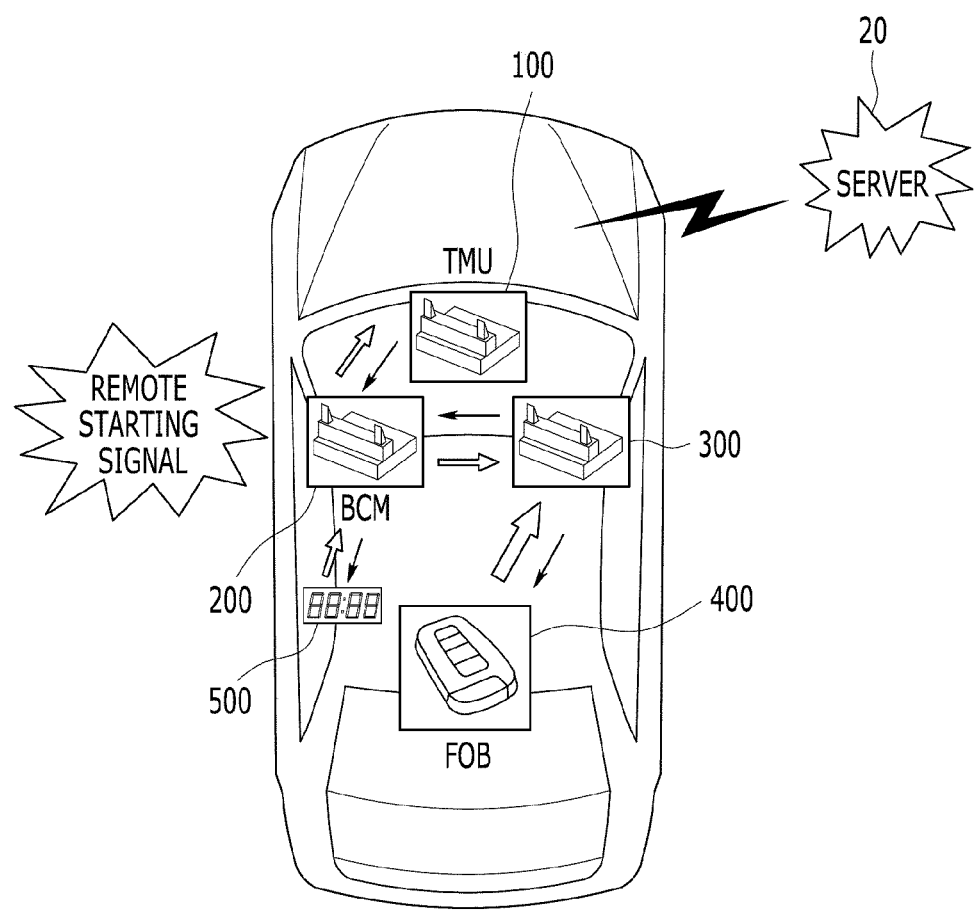
FIG. 1 is a schematic view of a remote starting system for a vehicle according to an exemplary embodiment of the present invention.
Figure 2:
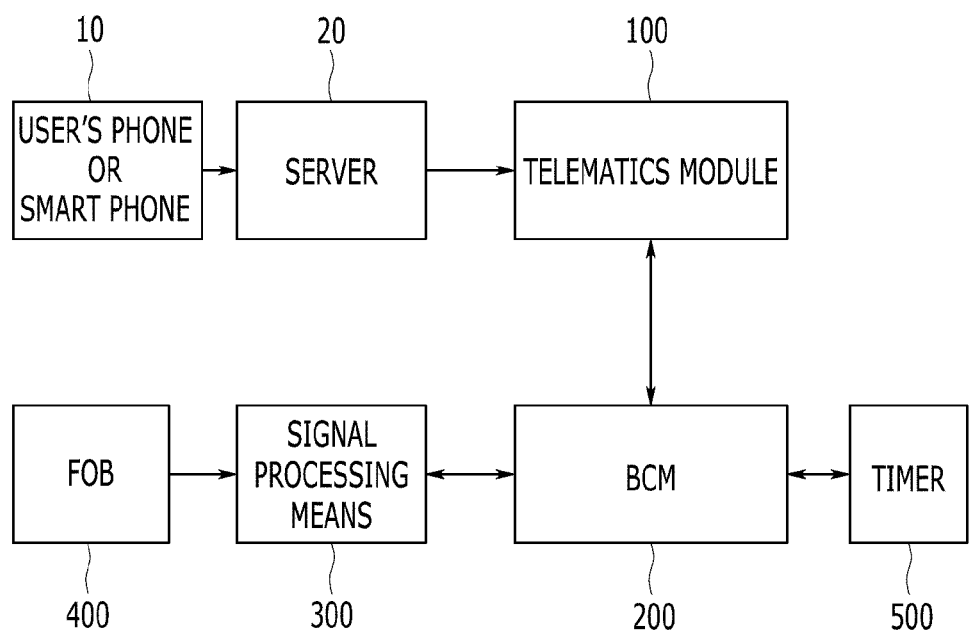
FIG. 2 is a block diagram of a remote starting system for a vehicle according to an exemplary embodiment of the present invention.

A vehicle remote starting system according to an exemplary embodiment of the present invention, as shown in FIG. 1 and FIG. 2, includes a telematics module (TMU) 100, a body control module (BCM) 200, a signal processing means 300 and a timer 500.

The telematics module (TMU) 100 receives remote start signal from a vehicle and transmits it to the body control module (BCM) 200. The body control module (BCM) 200 checks conditions of the vehicle and transmits the remote start signal to the signal processing means 300 when the remote start signal is an appropriate remote start signal for that specific vehicle.

The signal processing means 300 receives the remote start signal and checks the conditions of the vehicle. The signal processing means 300 implements the remote start when the conditions of the vehicle are normal and the timer 500 begins counting when a door of the vehicle is opened after initiating of the remote start.

The telematics module (TMU) 100 is connected with a communication network and relays the received remote start signal from the server to the body control module (BCM) 200.

As shown in FIG. 2, the remote start signal is transmitted from a user's terminal 10, such as a mobile phone or a smart phone, to the telematics module 100 via a server 20 and is relayed to the body control module 200.

In the exemplary embodiment of the present, remote start is defined as a method in which a vehicle is started using a mobile phone or application of a smart phone through a communication server 20 for e.g., adjusting the internal temperature of a vehicle.

Generally the body control module 200 controls vehicle's door Lock/door Unlock, trunk opening, warning sound and so on, and checks the vehicle's operational conditions. The body control module 200 also transmits the remote start signal to the signal processing means 300 when the remote start signal is associated with that particular vehicle only.

The body control module 200 also determines whether the vehicle is in a locked/unlocked state after initiating the remote start, and generates and transmits warning signal(s) to the signal processing means 300 when a door of the vehicle is opened in the locked state and terminates the remote start if necessary. The body control module 200 furthermore maintains the remote start when a door of the vehicle is opened in the unlock state, and the timer 500 then begins counting.

After starting a vehicle using remote start, it is possible for the vehicle to be stolen if a door is left unlocked, and thus the remote start is terminated immediately to prevent theft if necessary.

The signal processing means 300 receives the remote start signal from the body control module 200, checks the vehicle's conditions and implements the remote start only when the vehicle conditions are normal. In the illustrative embodiment of the present invention, a vehicle's smart key module (SMK) may be one of the signal processing means 300.

The signal processing means 300 searches a fob and certifies the fob when a driver's seat door (not shown) is closed, a brake (not shown) is operated, or a predetermined time (e.g., 30 seconds) has elapsed without any operation after the timer 500 has been started. The signal processing means then changes the remote start to normal start when the fob is certified or terminates the remote start if the fob is not certified.

Since it is possible for the vehicle to be stolen, the present invention prevents such theft by searching and certifying the fob 400 to immediately prevent the vehicle from being stolen.

The illustrative embodiment of the present invention determines that the vehicle is not being stolen by immediately certifying the fob 400 once the driver's door is opened or a brake is operated. And thus the driver must not perform any additional procedures once he or she enters the vehicle thereby increasing consumer convenience as well.

If doors other than the driver's door are closed or the predetermined time has elapsed without any operation after starting the timer 500, the remote start is maintained, and the timer 500 again begins counting. Once the predetermined time has elapsed system searches and certifies the fob 400 accordingly.

The signal processing means 300 terminates the remote start if a shift lever is shifted from Park to any other gear or position, a starting button is on, or the vehicle begins to move.

The fob 400 may be in smart card or a smart key of a vehicle, and the fob 400 may perform closing/opening (locking and unlocking) the doors of the vehicle or vehicle starting by communicating with a certifying system such as the signal processing means 300. Furthermore, the fob 400 is provided with a circuit for communication, keyless function, immobilizer function and so on.

The fob 400 may include a smart key as an exemplary embodiment as shown in FIG. 1, and the certification of the fob 400 may be implemented when the signal processing means 300 receives an unique ID signal from the fob 400 and it is determined that the received unique ID signal is appropriate for that particular vehicle.

The timer 500 counts a predetermined time elapsing after the remote start is initiated and a vehicle door has been opened. In some embodiments, the predetermined time may be 30 seconds as an example.

Hereinafter, a vehicle remote starting method according to an exemplary embodiment of the present will be described.

Figure 3:
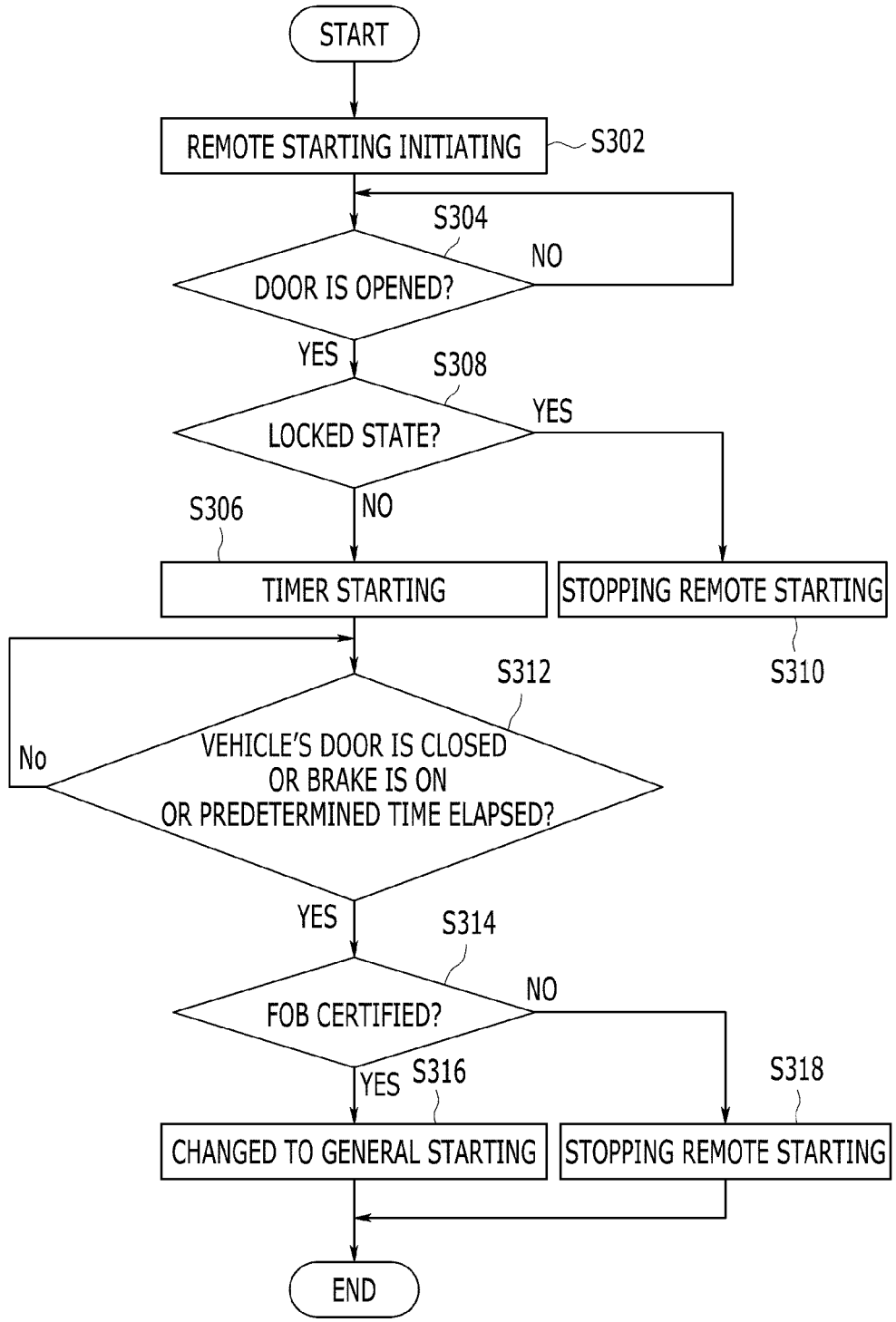
FIG. 3 is a flowchart of a control method for a remote starting system according to an exemplary embodiment of the present invention.

Referring to FIG. 3, a vehicle remote starting method according to an exemplary embodiment includes (a) starting a remote starting for a vehicle, (b) in response to remote starting, activating a timer 500 when a door of the vehicle is opened, (c) in response to activating the timer 500, searching a fob 400 and certifying the fob 400 once a driver's door is closed, a brake is operated, or a predetermined time has elapsed without any operation and (d) changing the remote start to a general start once the fob 400 is certified or terminating the remote starting when the fob 400 is not certified.

In the step (a), the remote start signal transmitted from the terminal 10 such as a mobile phone or a smart phone is relayed through the communication server 20 to the vehicle and the remote start is initiated S302.

Figure 4:
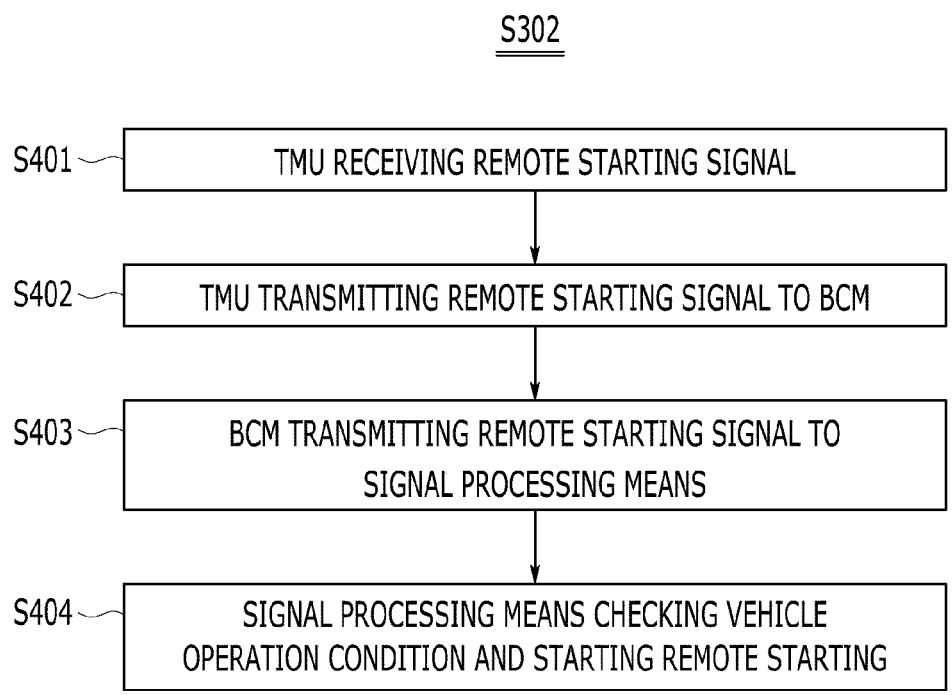
FIG. 4 is a flowchart of an initial remote starting step of a control method for a remote starting system according to an exemplary embodiment of the present invention.

The remote start initiating step S302 is described in detail in FIG. 4. The telematics module (TMU) 100 receives a remote start signal from the server 20 S401, and transmits the signal to the body control module (BCM) 200 S402, and the body control module (BCM) 200 checks conditions of the vehicle and transmits the remote start signal to the signal processing means 300 when the remote start signal is appropriate signal for that particular vehicle S403. The signal processing means 300 receives the remote start signal and checks the conditions of the vehicle and the signal processing means 300 implements the remote starting when the conditions of the vehicle are normal S404.

In the step (b), timer 500 is operated as shown in FIG. 3, and when a door is opened after implementation of the remote starting S304, the timer 500 begins counting S306. The predetermined time may be 30 seconds as an example for securing convenience and simultaneously preventing theft of a vehicle.

As shown in FIG. 3, when a door is opened while the vehicle is locked after the remote start is initiated at the step (b) S308, the remote start is immediately terminated S310 to preventing theft of a vehicle.

The body control module 200 determines whether the vehicle is in lock state, and when a door is opened in the locked state, the body control module 200 transmits warning signals to the signal processing means 300. The signal processing means 300 receives the warning signal and then terminates the vehicle remote start S310 if necessary due to, e.g., the door being opened while the vehicle is locked.

In the step (c), when a driver's seat door is closed, a brake is operated, or a predetermined time is elapsed without any operation after starting the timer 500 S312, the fob 400 of the vehicle is searched and certified S314. The certification of the fob 400 is implemented when the signal processing means 300 receives an unique ID signal from the fob 400 and it is determined that the received unique ID signal is appropriate for that particular vehicle.

In the step (d), the signal processing means 300 changes the remote start to normal starting mode when the fob 400 is certified S316 and the signal processing means 300 terminates the remote starting when the fob 400 is not certified S318. The case, of which the fob 400 is not certified, may occur when the searched fob 400 is not corresponding to that particular vehicle or that fob 400 is not in range.

When the fob 400 is certified, the remote start is changed to a general start mode so that driver's convenience may be enhanced, and when the fob 400 is not certified, the remote starting is terminated so that vehicle cannot be stolen.

Figure 5:
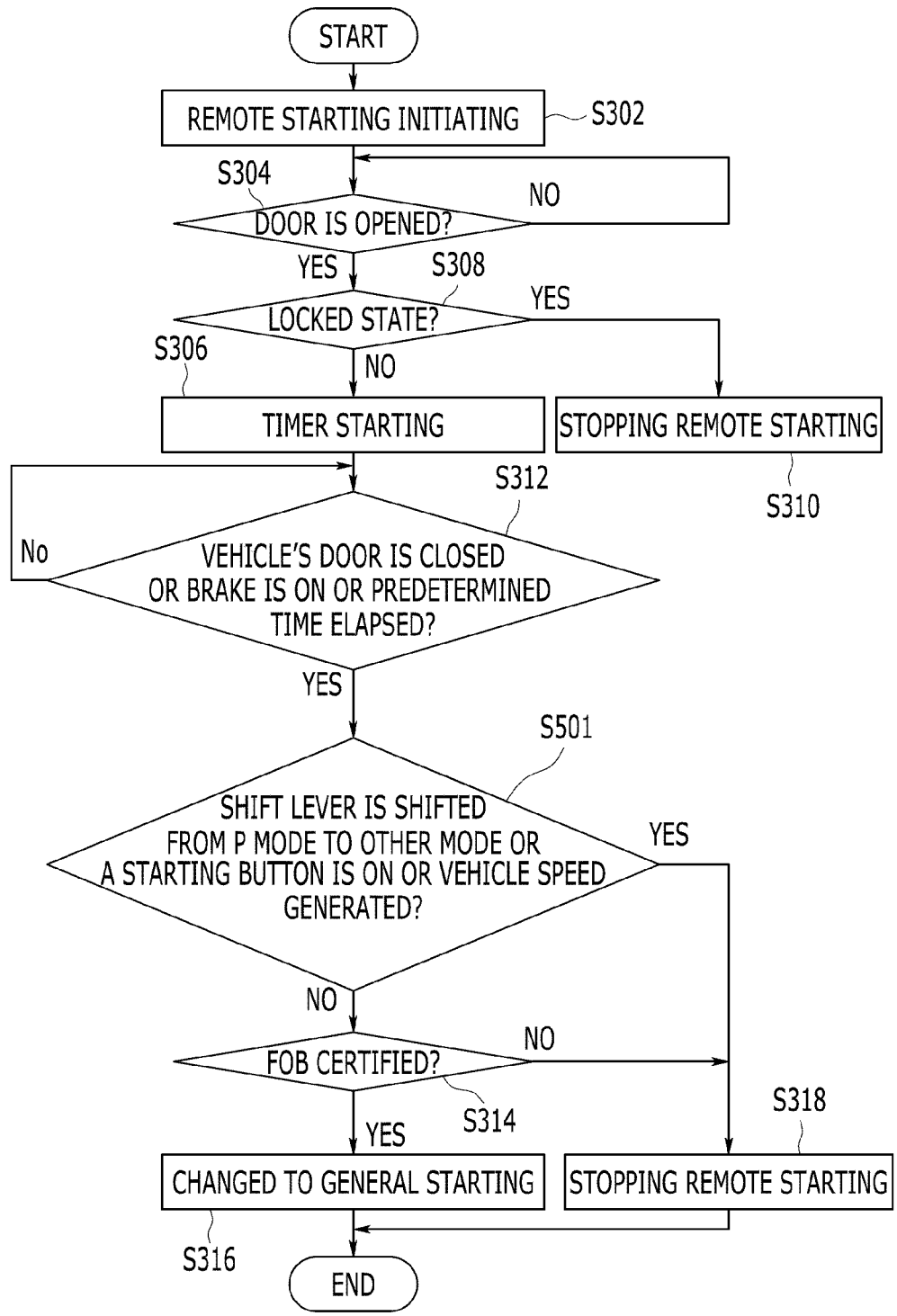
FIG. 5 is a flowchart of a control method for a remote starting system according to a modified exemplary embodiment of the present invention.

As shown in FIG. 5, according to a modified exemplary embodiment of the present invention, if a shift lever is shifted from Park mode to any other mode, a starting button is on, or vehicle speed is generated (the vehicle moves) after the remote start is commenced S501, the signal processing means 300 may terminate the remote start accordingly S318.

In the FIG. 5, while the step S501 is implemented after the step S312, however it is not limited as described in the FIG. 5. On the contrary, the step 501 may be implemented at any step after the step 302 with various modifications.

Furthermore, the control logic of the present invention may be embodied as computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server.

That is, although the above exemplary embodiments described the above control method as being performed by multiple modules and units, these units may be embodied as a single controller or control unit which executes a computer readable media stored on the above described computer readable medium(s).

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A control method for a remote starting system for a vehicle comprising:
   (a) remote starting the vehicle through a remote terminal, wherein a remote start signal received from the remote terminal is relayed to a telematics module of the vehicle, which transmits the remote start signal to a signal processing means through a body control module of the vehicle so as to initiate the remote start;
   (b) in response to remote starting the vehicle, activating a timer when a door of the vehicle is opened;
   (c) once the timer is activated, searching a fob and certifying the fob when a driver's door is closed, a brake is operated, or a predetermined time has elapsed on the timer without any operation in the vehicle;
   (d) converting the vehicle from a remote start mode to a normal start mode when the fob is certified; and
   (e) terminating the remote start when the fob is not certified.

2. The control method of claim 1, wherein the remote start is terminated when a shift lever is shifted from Park to any other mode, a starting button is turned on, or the vehicle begins to move when the fob is not certified first.

3. The control method of claim 1, wherein when a door is opened while the vehicle is locked in the step (b), the remote start is terminated.

4. The control method of claim 1, wherein the fob is certified once the signal processing means receives a unique ID signal from the fob and certifies the fob is using the received unique ID signal.

5. A remote starting system for a vehicle comprising:
   a telematics module configured to receive a remote start signal for the vehicle;
   at least one body control module configured to check operating conditions of the vehicle and receive a remote start signal from the telematics module and to transmit the remote start signal once the remote start signal is determined to be associated with that particular vehicle;

a signal processing means configured to receive the remote start signal transmitted from the body control module and check the vehicle's operational condition, and to initiate the remote start of the vehicle; and a timer configured to activate when a door of the vehicle is opened once remote start has initiated, wherein the signal processing means is further configured to search a fob and certify the fob once a driver's door is closed, a brake is operated, or a predetermined time has elapsed on the timer without any operation of the vehicle once the remote start has commenced, and convert the vehicle from a remote start mode to a normal operating mode when the fob is certified, and in response to not certifying the fob, terminating the remote start, the body control module transmits a warning signal to the signal processing means once a door is opened while the vehicle is locked after the remote start is initiated, and the signal processing means is further configured to receive the warning signal and terminate the remote start.

6. The remote starting system of claim 5, wherein the signal processing means is further configured to terminate the remote start when a shift lever is shifted from Park to any other position, a starting button activated or the vehicle is moved.

7. The remote starting system of claim 5, wherein the fob is certified once the signal processing means receives a unique ID signal from the fob and certifies the fob is using the received unique ID signal.

8. A non-transitory computer readable medium containing program instructions executed by a controller, the computer readable medium comprising:

program instructions that remote start a vehicle through a remote terminal, wherein a remote start signal received from the remote terminal is relayed to a telematics module of the vehicle, which transmits the remote start signal to a signal processing means through a body control module of the vehicle so as to initiate the remote start;

program instructions that activate a timer when a door of the vehicle is opened when the vehicle has been remote started;

program instructions that, once the timer is activated, search a fob and certifying the fob when a driver's door is closed, a brake is operated, or a predetermined time has elapsed on the timer without any operation in the vehicle;

program instructions that convert the vehicle from a remote start mode to a normal start mode when the fob is certified; and program instructions that terminate the remote start when the fob is not certified.

9. The non-transitory computer readable medium of claim 8, further comprising program instructions that generate a warning signal once a door is opened while the vehicle is locked after remote start is initiated to terminate the remote start.

10. The non-transitory computer readable medium of claim 8, further comprising program instructions that terminate the remote start when a shift lever is shifted from Park to any other position, a starting button activated or the vehicle is moved.

11. The non-transitory computer readable medium of claim 8, wherein the fob is certified once the signal processing means receives a unique ID signal from the fob and certifies the fob is using the received unique ID signal.

\* \* \* \* \*